(12) United States Patent
Riemenschneider, III et al.

(10) Patent No.: US 11,609,135 B2
(45) Date of Patent: Mar. 21, 2023

(54) CONTAINMENT FORCE APPARATUS FOR MEASURING CONTAINMENT FORCE ON A LOAD

(71) Applicant: Paul Kurt Riemenschneider, III, Wyoming, MI (US)

(72) Inventors: Paul Kurt Riemenschneider, III, Grandville, MI (US); Robert Edward Kwock-Fai Ching, Elsie, MI (US); Lucas James Venechuk, Grand Rapids, MI (US)

(73) Assignee: Paul Kurt Riemenschneider, III, Wyoming, MI (US)

( * ) Notice: Subject to any disclaimer, the term of this patent is extended or adjusted under 35 U.S.C. 154(b) by 290 days.

(21) Appl. No.: 17/029,293

(22) Filed: Sep. 23, 2020

(65) Prior Publication Data

US 2021/0088395 A1    Mar. 25, 2021

Related U.S. Application Data

(60) Provisional application No. 62/903,982, filed on Sep. 23, 2019.

(51) Int. Cl.
| | |
|---|---|
| *G01L 5/10* | (2020.01) |
| *G01M 99/00* | (2011.01) |
| *B65B 57/04* | (2006.01) |

(52) U.S. Cl.
CPC ............... *G01L 5/10* (2013.01); *B65B 57/04* (2013.01)

(58) Field of Classification Search
CPC .. G01N 3/52; G01N 2203/0083; G01N 3/307; G01N 2203/0091; G01N 2203/0282; G01N 2203/0254; G01M 99/007
See application file for complete search history.

(56) References Cited

U.S. PATENT DOCUMENTS

| | | | | |
|---|---|---|---|---|
| 4,823,473 | A * | 4/1989 | McMahon | G01B 5/30 |
| | | | | 33/787 |
| 4,901,581 | A * | 2/1990 | Fain | G01N 3/08 |
| | | | | 73/159 |
| 6,513,369 | B1 * | 2/2003 | Chew | G01N 3/42 |
| | | | | 73/81 |
| 7,707,901 | B2 | 5/2010 | Lancaster, III et al. | |
| 8,074,496 | B2 * | 12/2011 | Brandestini | G01N 3/48 |
| | | | | 713/323 |
| 8,261,620 | B2 * | 9/2012 | Brandestini | G01N 3/307 |
| | | | | 73/803 |
| 8,261,621 | B2 | 9/2012 | Parikh | |
| 8,739,502 | B2 | 6/2014 | Lancaster, III | |
| 9,488,557 | B2 * | 11/2016 | Lancaster, III | B65B 11/025 |

(Continued)

*Primary Examiner* — Tran M. Tran
(74) *Attorney, Agent, or Firm* — McGarry Bair PC

(57) ABSTRACT

A containment force apparatus and method a containment force apparatus for measuring containment force on a load, the apparatus comprising a first element configured to contact the load; a second element configured to engage at least a portion of a packaging material on the load and move between a first position associated with the first element to a second position perpendicular to the first position and spaced from the first element a measured distance; an actuator configured to urge the second element to move between the first position and the second position; and a force sensor configured to measure a force exerted on one of the first element or the second element.

19 Claims, 5 Drawing Sheets

(56) References Cited

U.S. PATENT DOCUMENTS

| | | |
|---|---|---|
| 9,891,120 B2 | 2/2018 | Ceré |
| 10,239,645 B2 * | 3/2019 | Lancaster, III ....... B65B 11/045 |
| 2003/0110737 A1 | 6/2003 | Lancaster et al. |
| 2018/0238853 A1 | 8/2018 | Effler, Jr. et al. |
| 2020/0400532 A1 * | 12/2020 | Timpone .............. G01N 33/445 |
| 2021/0088427 A1 * | 3/2021 | Solanki .................... G01N 3/08 |
| 2021/0107757 A1 * | 4/2021 | Cere' ................... G01B 11/046 |
| 2022/0049998 A1 * | 2/2022 | Roudebush ............... G01L 5/06 |

\* cited by examiner

CONTAINMENT FORCE APPARATUS FOR MEASURING CONTAINMENT FORCE ON A LOAD

CROSS-REFERENCE TO RELATED APPLICATION

This application claims the benefit of U.S. Provisional Patent Application No. 62/903,982, filed Sep. 23, 2019, which is incorporated herein by reference in its entirety.

TECHNICAL FIELD

The present disclosure relates to a device for measuring containment forces exerted on a load by packaging material wrapped around the load.

BACKGROUND

Various packaging techniques have been used to build a load of unit products and subsequently wrap them for transportation, storage, containment and stabilization, protection and waterproofing. Products are often stacked as a load on a pallet to simplify handling of the products. The load is commonly wrapped with packaging material. Wrapping can be performed manually by an operator, semi-automatically by a machine, or as an inline, automated packaging technique that dispenses and wraps packaging material around a load to cover and contain the load. Wrapping, whether accomplished by a turntable, rotating arm, vertical rotating ring, a horizontal rotating ring, a handwrapper, or directly from the roll of film, typically covers the four vertical sides of the load with a film such as polyethylene film. Other materials may be tested such as shrink film, stretch hooding, strapping material, or other packing material. Stretch film may be applied to the four vertical faces, the four horizontal faces, or all six faces of a unit load.

Containment force is the amount of resistance force the packaging material wrapped around the load offers to being displaced. Various devices and techniques have been used to measure the containment force exerted on a load by packaging material wrapped around the load. One such technique is to use a spring scale attached to an unyielding disc. This technique, however, may possess multiple drawbacks as it may be heavily dependent on the user correctly reading the spring scale, pulling the scale in a uniform manner, pulling at a consistent angle, and positioning the device correctly in order to receive an accurate containment force reading.

SUMMARY

In accordance with the disclosure, a containment force apparatus for measuring containment force on a load wrapped the apparatus comprising a first element configured to contact the load, a second element configured to engage at least a portion of a packaging material on the load and move between a first position associated with the first element to a second position perpendicular to the first position and spaced from the first element a measured distance, an actuator configured to urge the second element to move between the first position and the second position, and a force sensor configured to measure a force exerted on one of the first element or the second element as the second element is moved from the first position to the second position.

In accordance with another aspect of the disclosure herein, a containment force apparatus for measuring containment force on a load, the apparatus comprising a body defining a housing, a contact arm coupled to the housing and configured to contact the load, an engaging arm extending from the housing for insertion between the packaging material and the load, the engaging arm configured to move at least a portion of the packaging material from a first position at the load to a second position, an actuator electrically powered, mounted between the contact arm and the housing, and configured to urge the contact arm to move away from the housing and in turn move the engaging arm between the first position and the second position; and a force sensor electrically connected to the actuator and configured to measure a force exerted on one of the contact arm or the engaging arm resulting from the movement of the packaging material between the first position and the second position.

In accordance with yet another aspect of the disclosure herein, a method for measuring containment force exerted on a load by a packaging material using a containment force apparatus having a housing, an actuator, and an engaging arm, the method comprising engaging the packaging material with the engaging arm disposed in a first position, contacting the load with a contact arm, actuating the actuator with a trigger electrically connected to the actuator to urge the contact arm away from the housing, moving the engaging arm into a second position, moving the packaging material a measured distance; and measuring the containment force exerted on the packaging material associated with the measured distance.

Additional objects and advantages of the disclosure will be set forth in part in the description which follows, and in part will be obvious from the description, or can be learned by practice of the disclosure.

DETAILED DESCRIPTION

Aspects of the disclosure described herein are directed to a containment force apparatus. For purposes of illustration, the containment force apparatus will be described with respect to a stretch wrapped material wrapped around a load in the shape of a box. It will be understood, however, that aspects of the disclosure herein are not so limited and may have general applicability for measuring a containment force of any type of packaging material and any type of load. As used herein, the terms "packaging material," "web," "film," "film web," and "packaging material web" can be used interchangeably.

Figure 1:
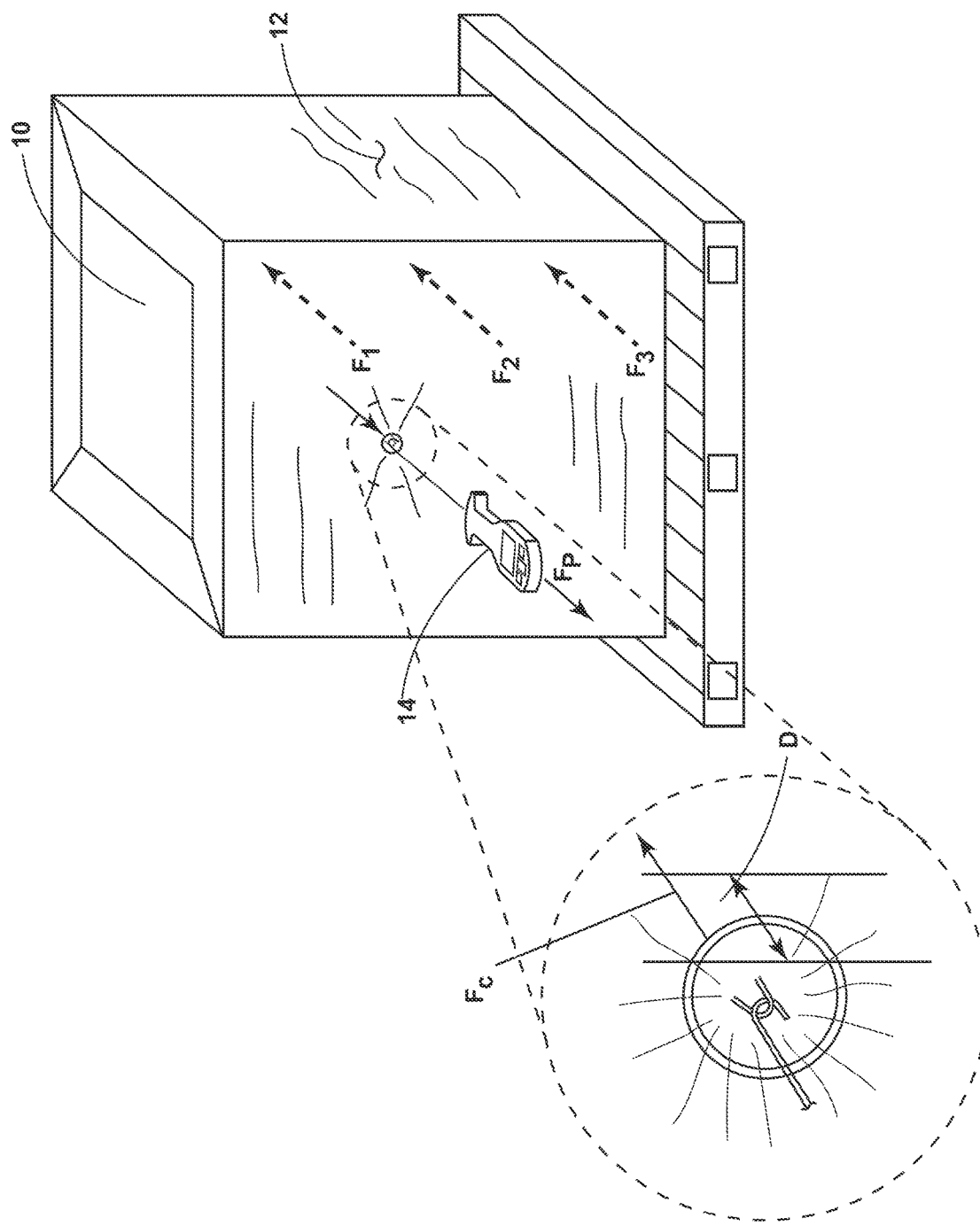
FIG. 1 is a schematic of a package wrapped in a packaging material with a force sensor attached to the packaging material.

FIG. 1 is a schematic illustration of a load 10 wrapped with a packaging material 12. A packaging material dispenser (not illustrated) can be used to dispense the packaging material 12 as a sheet of film in a web form. In an exemplary load 10 the packaging material 12 can be stretch wrap packaging material. However, it should be understood that various other packaging materials such as netting, strapping, banding, shrink film, shrink hooding, stretch hooding, cording, wire, or tape can be used as well.

After a period of time the film web can begin to expand or relax and conform to the load. During this time period a holding force, or containment force, exerted on the load from the film web can stay stable, can decrease, or can increase. A waiting time of 5 minutes is recommended in ASTM 4649 Annex 1 before testing the containment force on the load. For example, after applying the film web, the holding force can be 10 lbf, after 5 minutes it may be 9.5 lbf, and after one hour the holding force may be 9.0 lbf. Film forces typically go down over time, though there are some circumstances that can cause the force to stay stable or to rise.

It is further contemplated that the packaging material dispenser can include a pre-stretch assembly including pre-stretch rollers configured to rotate at different speeds to stretch the film web. For example, the surface movement of one pre-stretch roller can differ in speed from another by about 40%, 75%, 200% or 300%, to obtain pre-stretching of 40%, 75%, 200% or 300%. Rapid elongation of the film web by the pre-stretch assembly, followed by rapid strain relief of the film web, can cause a "memorization" effect. Due to this "memorization" effect, the film web can actually continue to shrink for some time after being wrapped onto a load. Over time, the film web can significantly change holding force and conformation to the load. This characteristic of the film web can allow it to be used for wrapping loads, using the memory to build containment force and load conformity.

Measuring the containment force can be done by pulling (Fp) a force sensor 14 to displace the packaging material 12 a given distance (D) and measuring the force (Fc) exerted on the force sensor 14 by the packaging material 12. This displacement of the packaging material may be created by stretching the packaging material, taking up slack, or deforming the load onto which it has been applied. This measured force (Fc) is known as a containment force (Fc), which is the relative force exerted on all areas of the load by the layers of packaging material wrapped around the load. Containment force is a single measurement of a force capable of being optimized. Containment force is affected by several factors, including stiffness, tension, and number of layers of the packaging material 12, all of which can be measured and optimized. Containment force varies based on the type of film used (brand), the film gauge (thickness of film), the film stiffness, the prestretch level, the number of layers wrapped, and the wrap force. Various environmental, and material factors can affect the containment force of the packaging material 12 such as, but not limited to, the film stiffness, the film tension, the number of layers of the film, the wrapping pattern, the application method of the film, the time at which the film was applied, or the humidity and temperature of the environment the film was wrapped in or stored in. Variation of any one of these factors can result in a change in the containment force on the wrapped load. Containment force is a primary determinant of whether the load will be maintained in the "as made" or "as wrapped" condition during and after shipment. Loads wrapped with higher containment forces often survive the shipping process in better condition. A load can be described as having survived the shipping process if the load arrives at its destination in a satisfactory condition (e.g., the load has not shifted during shipping, the items forming the load have not come apart from the load, the items forming the load have not been crushed or torn during shipping, and/or the packaging material surrounding the load has not torn or unraveled during shipping). However, above a certain containment force, gains made in the condition of the load during and after shipping decrease while costs for achieving the containment force increase. It is possible to apply too great a containment force, film tension, or number of layers of packaging material, resulting in crushed or deformed items or loads which can have a negative effect on load stability and possibly negate the benefits of the additional containment force applied or even make the load less stable. For this reason, it is desirable to determine an "optimum" containment force that is sufficiently high to permit the load to survive shipping in an acceptable condition, which is not too high to have negative stability impacts, and simultaneously identifying a containment force that also will minimize the costs associated with wrapping the load.

The containment force (Fc) on the load is not consistent throughout the load. That is, a wrapped load can have a first containment force (F1) on a top portion of the load, a second containment force (F2) on the middle portion of the load, and a third containment force (F3) on a bottom of the load. The different containment forces at different portions of the load define a containment force profile (F1+F2+F3) of the load. Often, the top and middle containment forces will be the same and the bottom containment force will be higher. This can be due to the use of roping or gathering of film to wrap the base of the load and the pallet. It can also be due to the wrapping of additional layers of film on a lower portion of the load. Alternatively, the containment forces can be substantially the same throughout the load, or higher at the top or middle of the load. Additionally, the containment force can vary at a greater number of heights on the load than illustrated in FIG. 1. Additionally, the containment forces can vary at same heights along the load. For example, the containment force on a first side, at a height can be measured at a first value while the containment forces on a second side, at the same height can be measured at a second different than the first.

After identifying a containment force profile (F1+F2+F3) that yields loads that arrive at an end destination in a satisfactory condition, it is possible to vary the film selection, film gauge, prestretch level (if any), and wrap force used during the wrapping process to determine a combination of those factors that will provide the most cost effective way to achieve the identified containment force profile. The same containment force can be obtained in a variety of ways. For example, by applying many layers of film at a low wrap force or by applying fewer layers of film at a higher wrap force. The resulting containment force yields similar results during shipping regardless of how the containment force is achieved. Once such wrapping process parameters have been established, all loads can be wrapped at the same containment force profile. Containment force is affected by the film stiffness and the wrapping tension which each stabilize the load in different ways. Film stiffness resists deformation and offers resistance to the load changing shape, for instance if layers of items were to slide out of their original position the film would have to stretch and a stiffer film will resist this stretching to a greater degree. Wrap tension compresses the items within a unit load together so that there is more friction between the surfaces of the items and together they act more like a block of a uniform material. Different loads shift, move, and are unstable in differing inherent ways and some loads may benefit more from the effects of higher film stiffness than they would to higher wrapping tension. Some loads will benefit more from the effects of higher wrapping tension than they would to higher film stiffness. One containment force may not stabilize a load the same way under all circumstances, as the film stiffness and wrap tension may differ while still providing the same overall containment force.

Figure 2:
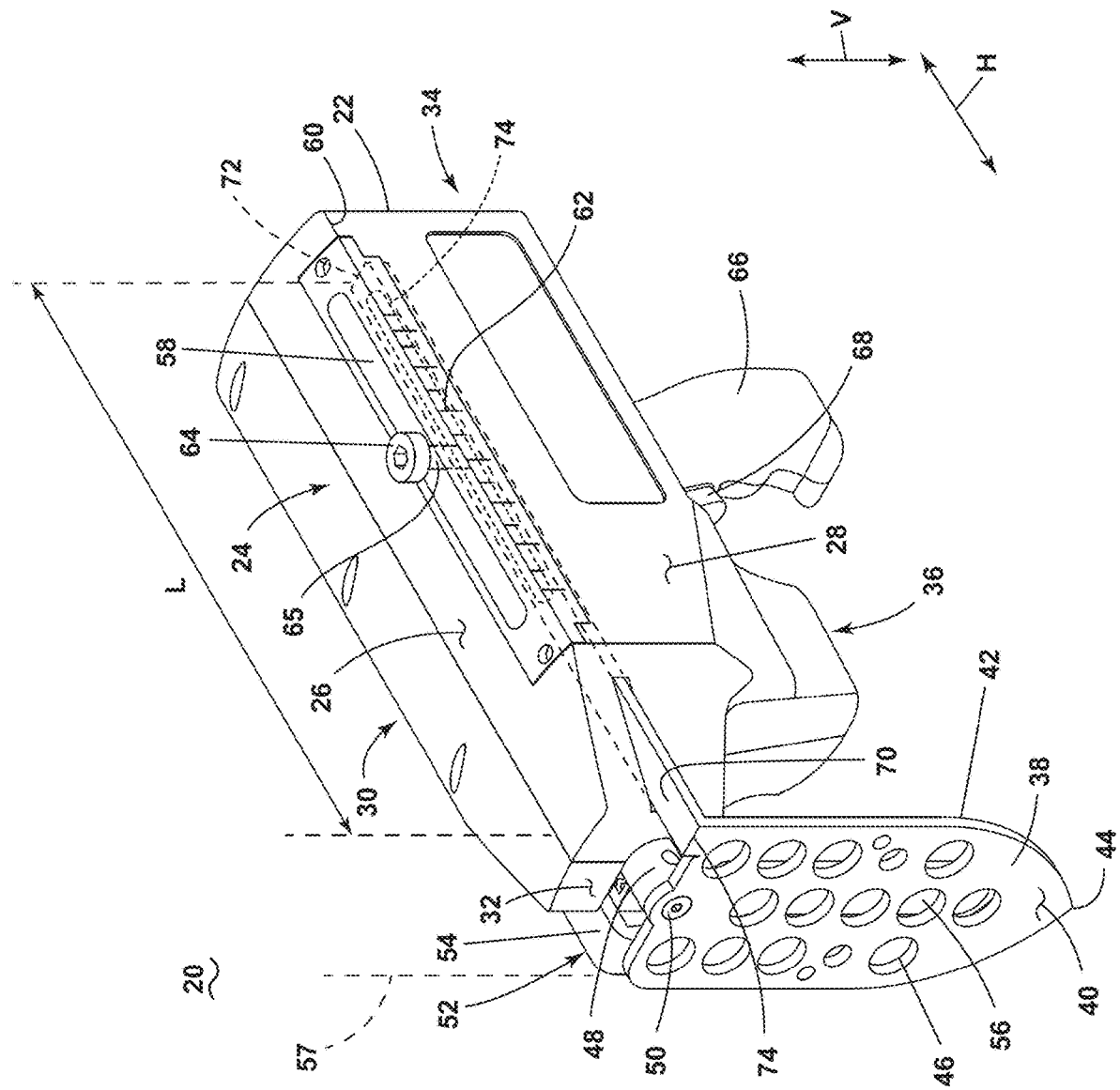
FIG. 2 is a perspective view of a containment force apparatus having a contact arm and an engaging arm, the engaging arm in a first position.

FIG. 2 is a perspective view of a containment force apparatus 20 that can be used to measure containment force (Fc) as described above. The containment force apparatus 20 can include a body 22 defining a housing 24 having a top 26, two sides 28, 30, a front 32, a back 34, and a bottom 36.

A first element, by way of non-limiting example a contact arm 38 extends in a primarily vertical direction (V) with respect to the housing 24 away from the top 26 and toward the bottom 36 of the housing 24. This first element may be made of steel, aluminum, plastic, or any sufficiently non-yielding material. The contact arm 38 can define a contact face 40 facing away from the front 32 of the containment force apparatus 20 and an interior face 42 facing the front 32 of the containment force apparatus 20. During operation the contact face 40 is in contact with the load 10, it should be understood that the contact face 40 can be in direct contact with the load 10 or be separated from the load by other packaging materials not being measured. The contact arm 38 can terminate in an apex 44. The apex 44 can be a sharp pointed end capable of piercing a material, by way of non-limiting example the packaging wrap 12 described herein. The contact face 40 can be formed such that it is substantially flat such that it can press up against, and slide smoothly along the load 10 without damaging the load 10. A portion of the contact arm 38 can include apertures 46 to decrease weight. It is further contemplated that the contact arm 38 is an arm, a plate, a bar, a rod, or that there is not any vertical element at all and only a horizontal element passing behind the film to press against the load. Some apertures can have different size and be utilized for accessory attachments. Accessories may be attached by other means including but not limited to slots, clips, adhesives, and magnets. Accessory attachment may include but are not limited to puncturing attachments, dart like attachments, strap tension measuring attachments, stationary attachments, and adjustable attachments.

An actuator 48 can be connected to the contact arm 38 by any suitable fastener, by way of non-limiting example a bolt 50. The actuator can extend horizontally from the body 22 toward the contact arm 38. The actuator 48 can extend between and be mounted to the housing and contact arm 38. The actuator 48 can be any suitable actuator, by way of non-limiting example a linear slide actuator as illustrated. The containment force apparatus 20 can be a hand-held device and include a handle 66 for an operator to easily hold the containment force apparatus 20. The handle 66 can include a trigger 68 operably coupled to the actuator 48. This trigger can be any type of button or switch, by way of non-limiting example a rocker switch which commands forward movement of the actuator when rocked to its first position and rearward movement of the actuator when rocked to its second position. A set of two buttons may accomplish the same purpose, as well as any combination of one or more buttons, switches, triggers, dials, slides, etc. It is contemplated that the actuator 48 is electrically powered and that the trigger 68 is electrically coupled to the actuator 48. However, the actuator can be manually enabled by a crank, gear system, or the like. It is also contemplated that the device as described herein is operable autonomously without user intervention.

A second element, by way of non-limiting example an engaging arm 52, can extend in a primarily horizontal direction (H) with respect to the housing 24, generally parallel to the top 26 to define a first portion 54, parallel to the actuator 48, and then can bend or otherwise be extended in the primarily vertical direction (V) to define a second portion 56. The second portion 56 can be seen through the apertures 46. The engaging arm 52 can remained fixed with respect to the housing 24 when the actuator 48 is actuated. This actuation urges the contact arm 38 to move, however because the contact arm 38 is in contact with the load 10, it remains stationary causing the engaging arm 52 to move between a first position 57 illustrated and a second position 59 (illustrated in FIG. 3) located at a measured distance (D) away from the first position 57. When in the first position 57, the second portion 56 of the engaging arm 52 can be flush with the contact arm 38.

A first elongated slot opening 58 can be formed in the housing 24, by way of non-limiting example along an edge 60 where the top 26 meets the side 28. A scale 62 for measuring the measured distance (D) can be mounted below the first elongated slot opening 58. A knob 64 for adjusting the measured distance (D) can extend above the housing 24. The knob 64 can include a stem 65 extending through the first elongated slot opening 58 into the housing 24.

A third element, by way of non-limiting example an extending arm 70 can define a length (L) between a first end 72 located within the body 22 and a second end 74 spaced horizontally from the front 32 of the body 22. The extending arm 70 can be an adjustable arm movable in and out of the body in the primarily horizontal direction (H). The extending arm 70 enables motion of the contact arm 38. It should be understood that this movement is relative. The contact between the load 10 and the contact arm 38 causes the contact arm 38 to move horizontally away from the housing 24, and in turn the engaging arm 52 to move horizontally away from the load 10. It is contemplated that the contact arm 38 can be formed from the same material as the extending arm 70 and be a uniform solid piece in the shape of an "L". It is also contemplated that the contact arm 38 is a separate piece mounted to the extending arm 70.

The extending arm 70 can include a second elongated slot opening 74 coincident with the first elongated slot opening 58. The knob 64 can extend into the second elongated slot opening 74 to couple the first elongated slot opening 58 to the second elongated slot opening 74. While illustrated as being located on the top 26 of the body 22, the knob 64 can be provided on any appropriate side 28, 30, 36 of the body 22. The knob 64 is horizontally moveable within the first and second elongated slots 58, 74 and can be used to adjust a distance amount associated with the measured distance (D) that the extending arm 70 can slide out of the housing 24.

Figure 3:
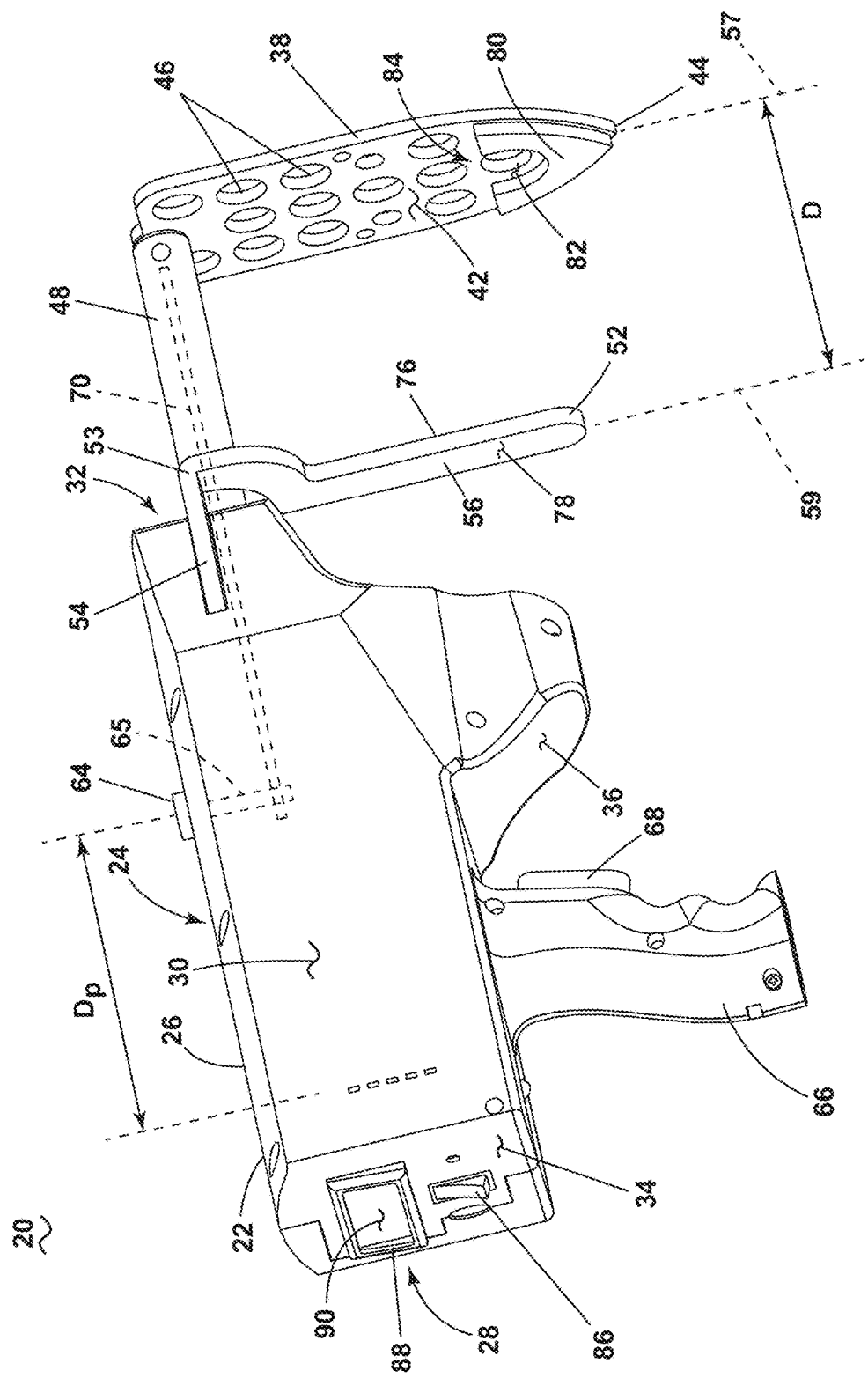
FIG. 3 is a perspective view of the containment force apparatus of FIG. 2 with the engaging arm in a second position.

FIG. 3 illustrates the containment force apparatus 20 in the second position. The engaging arm 52, and the interior face 42 of the contact arm 38 can also more clearly be seen. The interior face 42 of the contact arm 38 further includes a cap 80 located proximate the apex 44 and defining a cavity 82 with an opening 84 facing the interior face 42 of the contact arm 38. A remaining portion of the cavity can be open to the front 32 of the body 22.

The engaging arm 52 can also be referred to as a measuring arm in that during operation, the engaging arm pulls the packaging material 12 the measured distance (D), a predetermined measurement. The knob 64 can be adjusted a predetermined distance (Dp) equal to the measured distance (D) that the extending arm 70 can extend when in operation. The second portion 56 of the engaging arm 52 can extend in the primarily vertical direction (V) away from the actuator 48, and more specifically from the first portion 54 of the engaging arm 52 at a bend 53. In this manner the engaging arm can have a substantially "L" shape. The engaging arm can define a first, or measuring face 76, and a second, or packaging face 78 where the measuring face 76 faces the interior face 42 of the contact arm 38 and the packaging face 78 faces the front 32 of the body 22. The packaging face 78 is configured to engage the packaging material 12. It is further contemplated that the engaging arm 52 is a vertical arm, bar, plate, rod, or any vertical element capable of becoming caught behind the packaging material 12 and drawn away from the load 10. It is also possible that the engaging arm 52 be attached to the packaging material 12 from in front of the packaging material 12 by use of vacuum, adhesive, magnet, or other suitable attachment feature.

The body 22 can include a switch 86 for turning the containment force apparatus 20 on and off. While illustrated as located along the back 34, the switch 86 can be located anywhere on the body 22. The back 34 of the body 22 can further include a user interface 88 along with a display screen 90. The display screen 90 can be a touch screen including buttons that can control unit readings, i.e. lb, N, kg in which the containment force (Fc) is displayed. A tolerance button can also be included, along with a toggle switch. The user interface 88 can include other buttons such as, but not limited to, a data upload button, a tare button, a light switch, a brightness control, or the like. The user interface 88 can also include indicators in the form of the display screen 90, or audible or visual indicators such as a light or a buzzer. These indicators can indicate to the user of various conditions of the containment force apparatus 20 such as a power level, a charging status, an unbalanced force, an internal memory issue, or the like.

Figure 4:
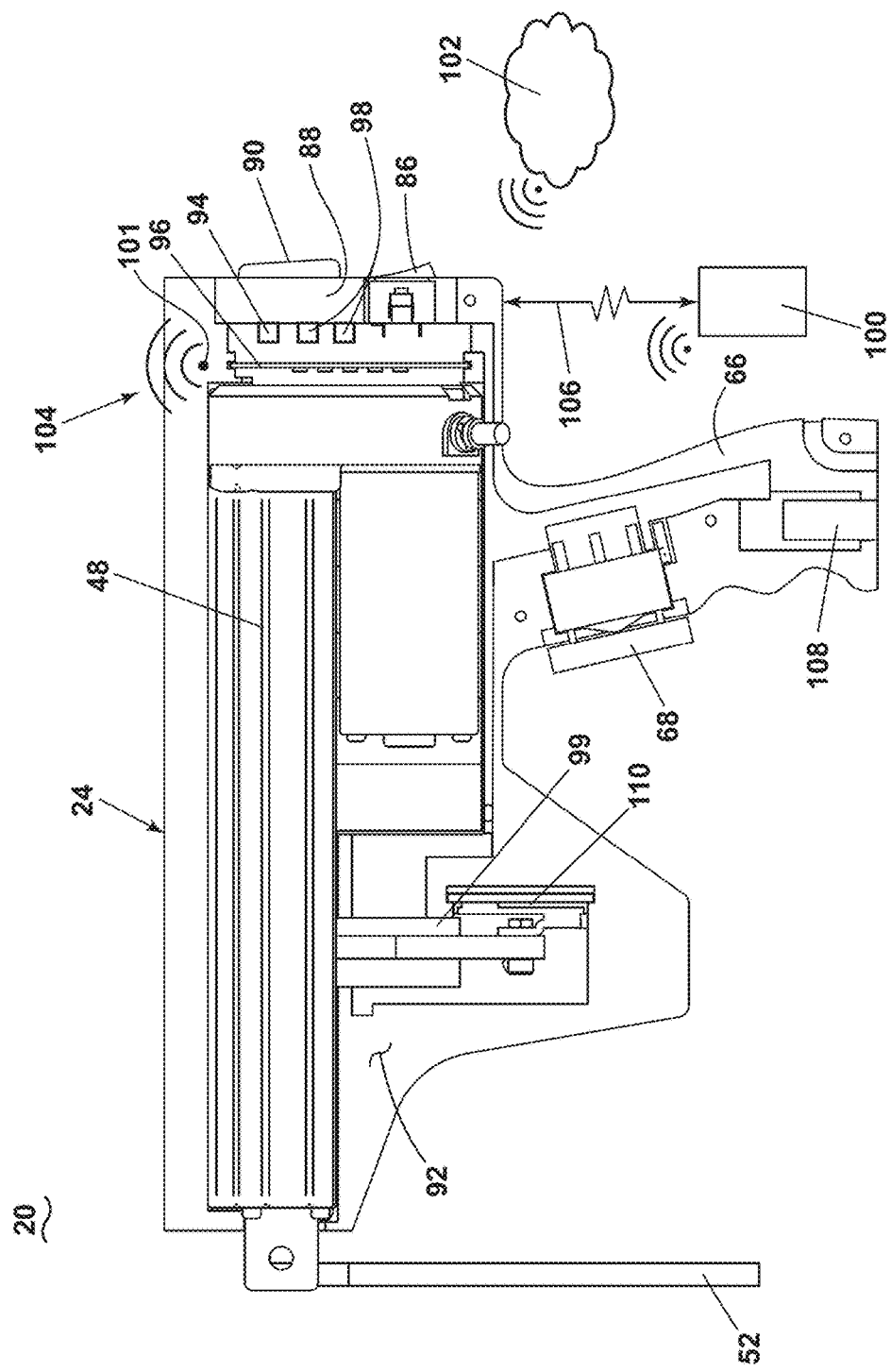
FIG. 4 is a side view of the containment force apparatus with a side wall removed to illustrate an interior of the containment force apparatus.

Turning to FIG. 4, the side 28, contact arm 38, and extending arm 70 have been removed to illustrate a housing interior 92. It should be understood that a memory 94, CPU 96, and other electrical components 98 necessary for providing the calculations/output for the measurements described herein can be incorporated into the containment force apparatus 20, and more particularly located within the housing interior 92. There are additional measuring electrical components 99 used to measure the containment force (Fc) all of which are electrically transmitted to be displayed at the user interface 88 on the display screen 90. Additional electrical components of the containment force apparatus 20 can be included such as a wireless transmitter 101. It is alternatively contemplated that the only electrical components of the containment force apparatus 20 are an electrical output reading of the containment force, i.e. when the actuator is manually operated by a crank, gear system, or the like. It will be appreciated that the containment force (Fc) may be read and displayed by a non-electrical measurement system such as a spring scale, gauge, analog display, etc.

The containment force apparatus 20 can be in signal communication with a network 100 or cloud 102 for data collection and storage. The CPU 96 within can be wirelessly in communication via a built in Wi-Fi System 104 such that the network 100 is constantly updated with readings. It is further contemplated that the memory 94 within the containment force apparatus 20 stores readings. These readings can be uploaded upon docking 106 the containment force apparatus 20. Systems integrated within the containment force apparatus 20 can record, and display test data via the built in Wi-Fi system 104. It is also contemplated that a USB 108 or other portable storage device is removed from the containment force apparatus 20 and connected to a network for uploading stored readings.

A force sensor 110, by way of non-limiting example a strain gauge connected to the contact arm 38, the engaging arm 52, or the actuator 48, can be secured within the housing interior 92 or can be mounted in other places. Forces exerted on either the contact arm 38, the engaging arm 52, or both, can be read and displayed on the display screen 90.

Figure 5:
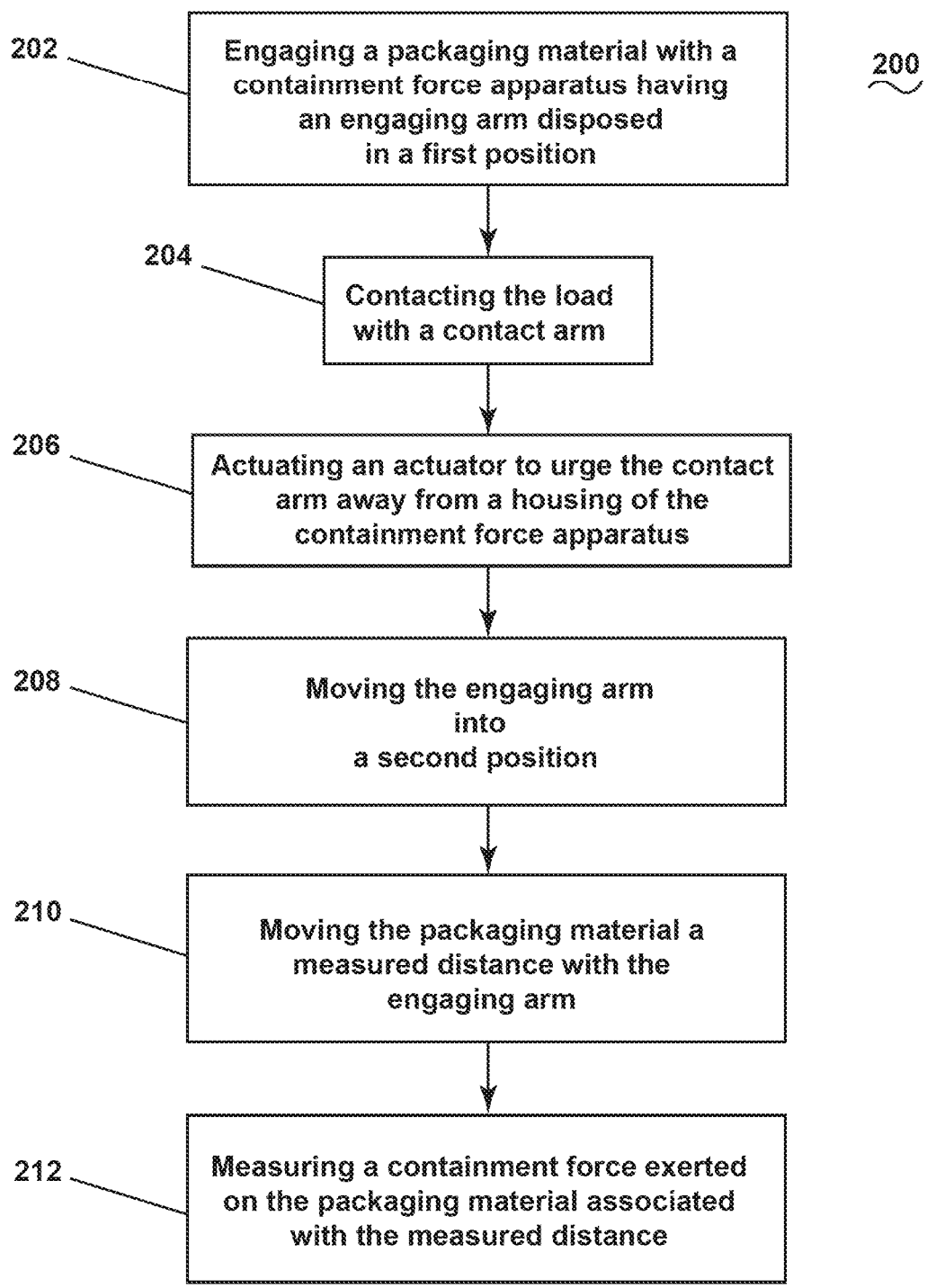
FIG. 5 is a flow chart illustrating a method of measuring a containment force with the containment force apparatus.

FIG. 5 is a flow chart for a method 200 of measuring the containment force (Fc). The method 200 includes at 202 engaging the packaging material 12 with the containment force apparatus 20, and more specifically the engaging arm 52, disposed in the first position 57. At 204 contacting the load 10 with the contact arm 38 located behind the packaging material 12 wrapped around the load 10 as described herein. Engaging the packaging material 12 and contacting the load 10 can occur separately or simultaneously. The apex 44 can be used to puncture the stretch film and the shape of the contact arm 38 enables an easy positioning of the contact arm 38 and engaging arm 52 behind the packaging material 12. The cap 80 as described herein guides the film over the engaging arm 52 and prevents the engaging arm 52 from becoming entangled when positioning the contact arm 38 and engaging arm 52. This may also be accomplished by nesting the engaging arm 52 in the contact arm 38 or having a space cut out of the contact arm 38 for the engaging arm 52 to pass through. The method can further include adjusting the knob 64 to the predetermined distance (Dp) equal to the measured distance (D).

The method further includes at 206 actuating the actuator 48, by way of non-limiting example engaging the trigger 68, to move the extending arm 70 out of the body 22 and in turn moving the contact arm 38 away from the housing 24 and the containment force apparatus 20 away from the load 10. In moving the extending arm 70, the method can include sliding the extending arm 70 along the second elongated slot 74 the predetermined distance (Dp). At 208 moving the engaging arm 52 into the second position, this movement can occur simultaneously to actuating the actuator 48. Separating the contact arm 38 from the engaging arm 52, creates space between the load 10 and the packaging material 12. The separation can occur such that the engaging arm 52 is located at the second position 59 at a point perpendicular to the first position 57. At 210 stretching the packaging material the measured distance (D) with the engaging arm 52. At 212 measuring the containment force (Fc) on the packaging material 12. It is contemplated that the measurement is then output to the display screen 90. It is further contemplated that a hold feature is incorporated into the user interface 88 that enables a peak force to be determined and output at the display screen 90. The peak force read and displayed on the display screen 90 can be the active reading of the force at any point during movement of the engaging arm between the first and second position as the containment force apparatus 20 operates. Further, the peak force read and displayed on the display screen 90 can be the force once the engaging arm 52 has sufficiently settled and is no longer changing rapidly. This ensures a maximum force reading is collected. The containment force (Fc) can be a measurement of the amount of force resulting from the contact arm 38 pressing against the load, or the amount of force on the engaging arm 52 from pulling the packaging material 12 away from the load 10. Either force is equal to the force exerted on the packaging material 12. This amount of force applied is collected by any suitable scale within the housing of the containment force apparatus 20 for measuring force, by way of non-limiting example the force sensor 114.

It is further contemplated that the measurement of the containment force (Fc) can be determined by comparing the measured distance (D) to the associated force over at least two points in order to calculate the stiffness of the packaging material 12 (also called hardness, strength, or force to stretch) and the tension of the packaging material 12 (also called film force, force to wrap, tension, or compression). By taking multiple readings of the stretch and force of the packaging material 12, these two elements can be extricated from each other to provide two separate results. This could be useful as film stiffness is a vital element of a film's performance and has a significant impact on load stability.

Benefits associated with the disclosure described herein include decreasing the variation of containment force readings by eliminating any potential errors associated with manual testing with conventional containment force systems described herein. The containment force apparatus 20 described can be operated such that it can produce consistent and accurate results with little user intervention. Conventional systems are heavily user dependent which can result in an inaccurate reading if the user does not properly align the various components of the system, while on the other hand, the containment force apparatus is more straight forward to use and utilizes the actuator, force sensors, adjustment knob, and other various components to ensure an accurate and consistent containment force reading not dependent on the user. Additionally, the containment force apparatus is less intensive and easy to use for the operator. Additionally, the containment force apparatus requires less physical exertion by the operator in order to perform the test.

The containment force measuring tool of the present disclosure can be used to measure a containment force profile of the load without measuring the force of a rope of film around a bottom of the load. Alternatively, the measuring device can be used to separately determine the containment force provided by a rope around a base of the load. A containment force profile for a given wrapped load can be determined by measuring the containment force of the wrapped load at the top, middle, and bottom of the wrapped load. For example, inspection of loads after shipping can allow the selection of loads that are in a "satisfactory" condition after shipping. A load is in a satisfactory condition if the load has not shifted during shipping, the items forming the load have not come apart from the load, the items forming the load have not been crushed or torn during shipping, and/or the packaging material surrounding the load has not torn or unraveled during shipping.

It should be appreciated that these written descriptions have used examples to describe only certain embodiments of the invention and that many other variations could be contemplated. For instance, rather than the engaging arm 52 and the contacting arm 42 moving apart from each other linearly, one or more of the arms could rotate or pivot causing movement of the packaging material. Furthermore, a bladder could inflate to displace the packaging material and measure containment force. It is not necessary that the contacting arm 42 pass behind the packaging material, it is possible that the contacting arm may press through the packaging material against the load for testing as well. It is possible that no part of the tool need to contact the load, that the film may be tested while suspended apart from the load surface. The tool may be made with or without a housing 22, with or without one or more handles, with or without an apex 44 on the contacting arm, and with or without any of a number of other elements.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A containment force apparatus for measuring containment force on a load, the apparatus comprising a first element configured to contact the load, a second element configured to engage at least a portion of a packaging material on the load and move between a first position associated with the first element to a second position perpendicular to the first position and spaced from the first element a measured distance, an actuator configured to urge the second element to move between the first position and the second position, and a force sensor configured to measure a force exerted on one of the first element or the second element as the second element is moved from the first position to the second position.

The containment force apparatus of any preceding clause wherein the actuator is mounted to the first element.

The containment force apparatus of any preceding clause further comprising a third element coupled to the first element and movable a predetermined distance equal to the stretch distance.

The containment force apparatus of any preceding clause further comprising a body defining a housing having a housing interior.

The containment force apparatus of any preceding clause wherein the third element defines a length between a first end located within the housing interior and a second end located where the first element meets the third element.

The containment force apparatus of any preceding clause wherein the housing further comprises a first elongated slot opening and the third element comprises a second elongated slot opening coincident with the first elongated slot opening.

The containment force apparatus of any preceding clause further comprising a knob extending above the housing and having a stem extending into the housing interior through the first elongated slot opening and the second elongated slot opening.

The containment force apparatus of any preceding clause wherein the knob is adjustable to the predetermined distance.

The containment force apparatus of any preceding clause further comprising a body defining a housing having a housing interior defined by a top, front, back, bottom and two sides wherein the first element is a contact arm extending away from the top and toward the bottom of the housing and terminating in an apex and the second element is an engaging arm that remains fixed with respect to the housing, the engaging arm comprising at least a portion extending away from the top and toward the bottom of the housing and flush with the contact arm when in the first position.

The containment force apparatus of any preceding clause wherein the actuator is mounted to the contact arm to move the engaging arm away from the contact arm.

The containment force apparatus of any preceding clause further comprising an extending arm coupled to the contact arm and movable in and out of the housing a predetermined distance equal to the stretch distance.

The containment force apparatus of any preceding clause wherein the actuator is an electrically powered actuator.

The containment force apparatus of any preceding clause wherein the force sensor is configured to measure the force exerted on one of the first element or the second element at any point during movement of the engaging arm between the first and second position.

The containment force apparatus of any preceding clause further comprising a hold feature for measuring a peak force exerted on one of the first element or the second element at any point during movement of the engaging arm between the first and second position.

A containment force apparatus for measuring containment force on a load, the apparatus comprising a body defining a housing, a contact arm coupled to the housing and configured to contact the load, an engaging arm extending from the housing for insertion between the packaging material and the load, the engaging arm configured to move at least a portion of the packaging material from a first position at the load to a second position, an actuator electrically powered, mounted between the contact arm and the housing, and configured to urge the contact arm to move away from the housing and in turn move the engaging arm between the first position and the second position, and a force sensor electrically connected to the actuator and configured to measure a force exerted on one of the contact arm or the engaging arm resulting from the movement of the packaging material between the first position and the second position.

The containment force apparatus of any preceding clause wherein the second position is at a location perpendicular to the first position.

The containment force apparatus of any preceding clause wherein the force sensor is configured to measure the force exerted on one of the first element or the second element at any point during movement of the engaging arm between the first and second position.

The containment force apparatus of any preceding clause further comprising an extending arm coupled to the contact arm and movable in and out of the housing a predetermined distance.

A method for measuring containment force exerted on a load by a packaging material using a containment force apparatus having a housing, an actuator, and an engaging arm, the method comprising engaging the packaging material with the engaging arm disposed in a first position, contacting the load with a contact arm, actuating the actuator with a trigger electrically connected to the actuator to urge the contact arm away from the housing, moving the engaging arm into a second position, moving the packaging material a measured distance; and measuring the containment force exerted on the packaging material associated with the measured distance.

The method of any preceding clause wherein actuating the actuator further comprises moving an extending arm coupled to the contact arm out of housing.

The method of any preceding clause further comprising adjusting a knob to a predetermined distance equal to the stretch distance and associated with the extending arm prior to actuating the actuator.

The method of any preceding clause further comprising sliding the extending arm the predetermined distance along at least one elongated slot.

The method of any preceding clause wherein the second position is at a location perpendicular to the first position.

The method of any preceding clause wherein actuating the actuator to urge the contact arm away from the housing and moving the engaging arm into a second position occur simultaneously.

What is claimed is:

1. A containment force apparatus for measuring containment force on a load, the apparatus comprising:
   a first element configured to contact the load;
   a second element configured to engage at least a portion of a packaging material on the load and move between a first position associated with the first element to a second position perpendicular to the first position and spaced from the first element a measured distance;
   an actuator configured to urge the second element to move between the first position and the second position; and
   a force sensor configured to measure a force exerted on one of the first element or the second element as the second element is moved from the first position to the second position;
   wherein the actuator is an electrically powered actuator.

2. The containment force apparatus of claim 1 wherein the actuator is mounted to the first element.

3. The containment force apparatus of claim 2 further comprising a third element coupled to the first element and movable a predetermined distance equal to the measured distance.

4. The containment force apparatus of claim 3 further comprising a body defining a housing having a housing interior.

5. The containment force apparatus of claim 4 wherein the third element defines a length between a first end located within the housing interior and a second end located where the first element meets the third element.

6. The containment force apparatus of claim 5 wherein the housing further comprises a first elongated slot opening and the third element comprises a second elongated slot opening coincident with the first elongated slot opening.

7. The containment force apparatus of claim 6 further comprising a knob extending above the housing and having a stem extending into the housing interior through the first elongated slot opening and the second elongated slot opening wherein the knob is adjustable to the predetermined distance.

8. The containment force apparatus of claim 1 further comprising a body defining a housing having a housing interior defined by a top, front, back, bottom and two sides wherein the first element is a contact arm extending away from the top and toward the bottom of the housing and terminating in an apex and the second element is an engaging arm that remains fixed with respect to the housing, the engaging arm comprising at least a portion extending away from the top and toward the bottom of the housing and flush with the contact arm when in the first position.

9. The containment force apparatus of claim 8 wherein the actuator is mounted to the contact arm to move the engaging arm away from the contact arm.

10. The containment force apparatus of claim 9 further comprising an extending arm coupled to the contact arm and movable in and out of the housing a predetermined distance equal to the stretch distance.

11. The containment force apparatus of claim 1 wherein the force sensor is configured to measure the force exerted on one of the first element or the second element at any point during movement of the second element between the first and second position.

12. The containment force apparatus of claim 11 further comprising a hold feature for measuring a peak force exerted on one of the first element or the second element at any point during movement of the engaging arm between the first and second position.

13. A containment force apparatus for measuring containment force on a load, the apparatus comprising:
   a body defining a housing;
   a contact arm coupled to the housing and configured to contact the load;
   an engaging arm extending from the housing for insertion between the packaging material and the load, the engaging arm configured to move at least a portion of the packaging material from a first position at the load to a second position;
   an actuator electrically powered, mounted between the contact arm and the housing, and configured to urge the contact arm to move away from the housing and in turn move the engaging arm between the first position and the second position; and
   a force sensor electrically connected to the actuator and configured to measure a force exerted on one of the contact arm or the engaging arm resulting from the movement of the packaging material between the first position and the second position.

14. The containment force apparatus of claim 13 wherein the second position is at a location perpendicular to the first position.

15. The containment force apparatus of claim 13 wherein the force sensor is configured to measure the force exerted on one of the first element or the second element at any point during movement of the engaging arm between the first and second position.

16. The containment force apparatus of claim 13 further comprising an extending arm coupled to the contact arm and movable in and out of the housing a predetermined distance.

17. A method for measuring containment force exerted on a load by a packaging material using a containment force apparatus having a housing, an actuator, and an engaging arm, the method comprising:
   engaging the packaging material with the engaging arm disposed in a first position;
   contacting the load with a contact arm;
   actuating the actuator with a trigger electrically connected to the actuator to urge the contact arm away from the housing;
   moving the engaging arm into a second position;
   moving the packaging material a measured distance; and
   measuring the containment force exerted on the packaging material associated with the measured distance.

18. The method of claim 17 wherein actuating the actuator further comprises moving an extending arm coupled to the contact arm out of housing.

19. The method of claim 18 further comprising adjusting a knob to a predetermined distance equal to the measured distance and associated with the extending arm prior to actuating the actuator.

* * * * *